July 5, 1932.  G. R. ERICSON  1,866,299
AIRCRAFT ACCESSORY
Filed Jan. 4, 1929  4 Sheets-Sheet 1

Inventor:
George R. Ericson

July 5, 1932.  G. R. ERICSON  1,866,299
AIRCRAFT ACCESSORY
Filed Jan. 4, 1929  4 Sheets-Sheet 2
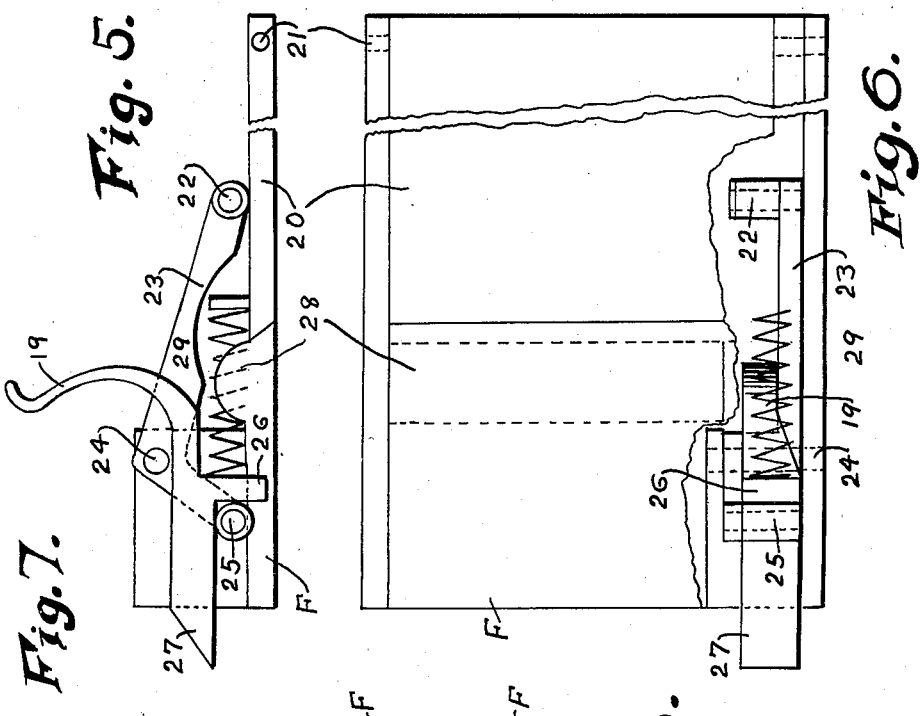
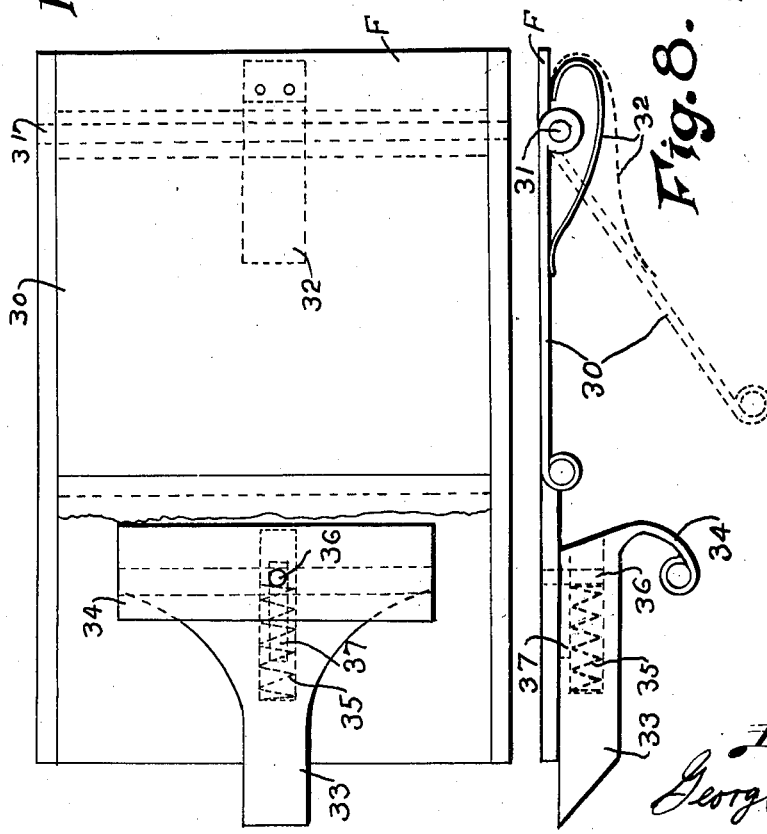
Inventor:
George R. Ericson July 5, 1932. G. R. ERICSON 1,866,299
AIRCRAFT ACCESSORY
Filed Jan. 4, 1929 4 Sheets-Sheet 3
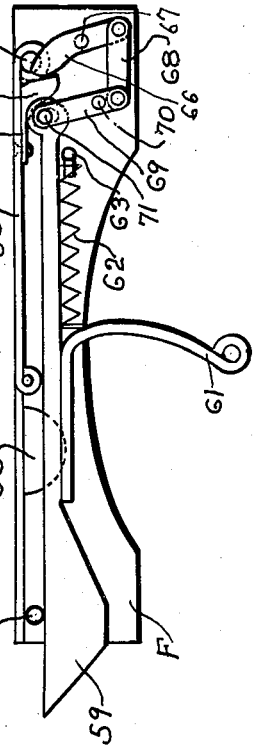
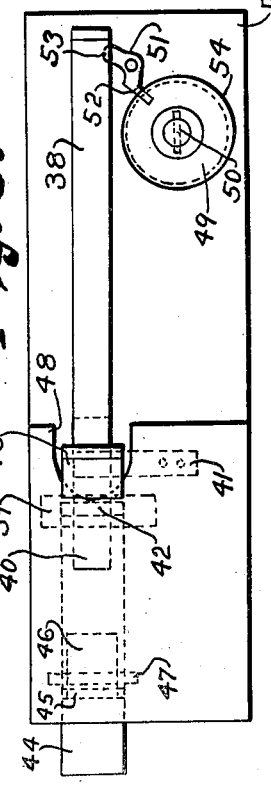
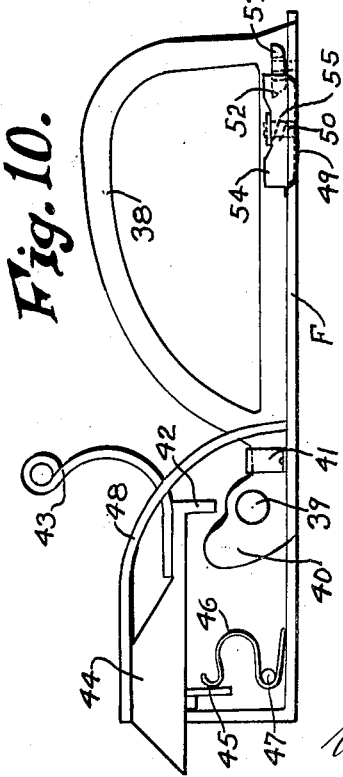
Inventor:
George R. Ericson July 5, 1932. G. R. ERICSON 1,866,299
AIRCRAFT ACCESSORY
Filed Jan. 4, 1929 4 Sheets-Sheet 4
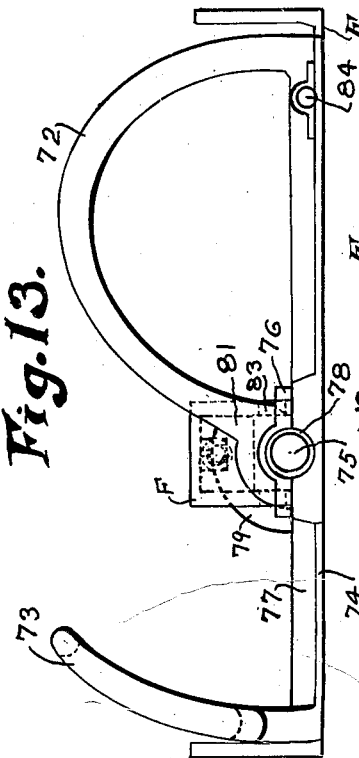
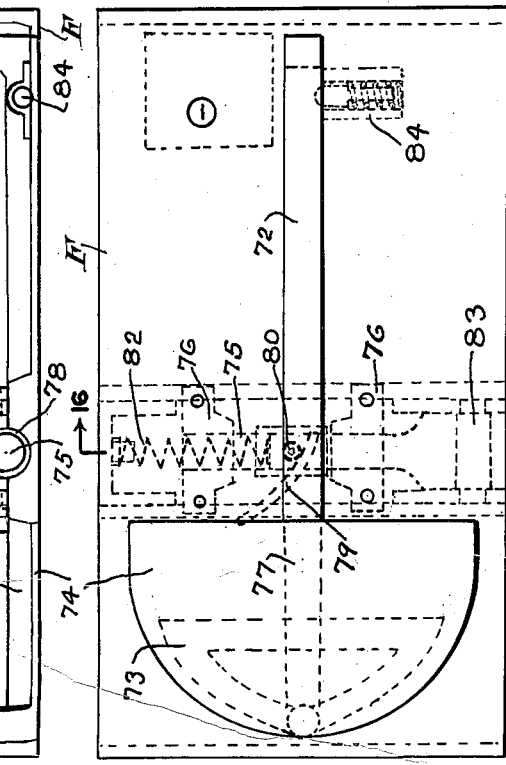
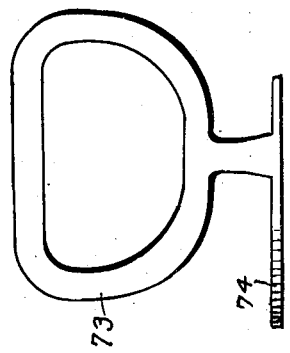
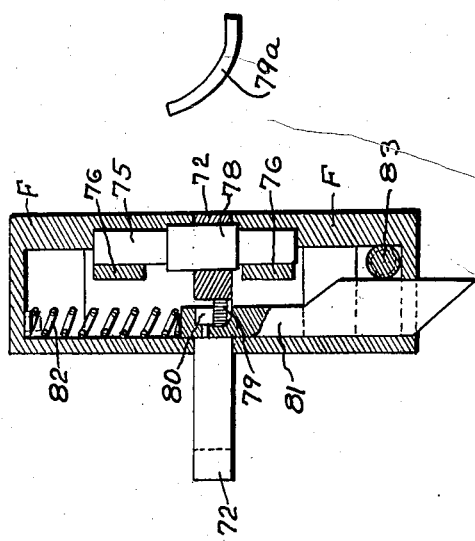
Inventor:
George R. Ericson Patented July 5, 1932

1,866,299

UNITED STATES PATENT OFFICE

GEORGE R. ERICSON, OF ALEXANDRIA, VIRGINIA

AIRCRAFT ACCESSORY

Application filed January 4, 1929. Serial No. 330,238.

The object of this invention is to provide a door latch for use on air-craft or other rapidly moving vehicles where air resistance is a consideration which has no protruding handle on the outside and which presents a smooth surface on the outside of the door. The fittings now commonly in use have handles similar to those used on automobile doors. Though the resistance of a door handle is small in comparison to the total resistance of an airplane or other air-craft, yet each part helps to make the total, and today every effort is being made to make air-craft and other vehicles of transportation with as small a head resistance as possible.

There are good reasons for wanting to reduce this resistance, for the resistance of a body traveling through the air varies as the square of the speed and the power required to move the body varies as the cube of the speed. The trend in air-craft and automobiles today is toward higher and higher speeds so that every reduction in resistance means increased speed and longer cruising distance for the same H. P. engine and the same load of fuel. Every protuberance and every depression from a smooth surface set up eddy currents which represent energy which must be supplied by the power plant.

Other objects of this invention are to provide a door latch which is simple in construction, light in weight, rugged and durable and convenient to operate.

Referring to the drawings:

Fig. 5 is a side view of another type of latch and Fig. 6 a front elevation with part of the front surface removed.

Fig. 7 is a front elevation and Fig. 8 is a side view of another modification.

Fig. 9 is an elevation (looking from the inside) and Fig. 10 a side view of another modification.

Fig. 11 is a front elevation and Fig. 12 a side view of another modification.

Fig. 13 is a side view and Fig. 14 a front elevation of another modification. Fig. 15 is an end view showing the inside handle and Fig. 16 is a section on the line 16—16 of Fig. 14.

Figure 1:
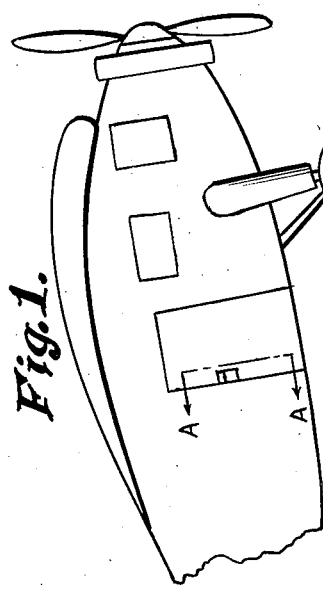
Fig. 1 is a part view of an airplane, showing one of the door latches installed on an airplane door.
Figure 1A:
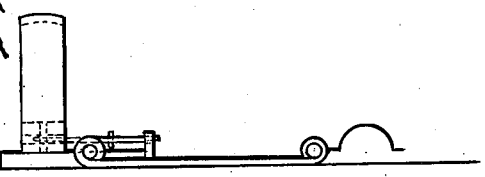
Fig. 1A is a section taken on A—a of Fig. 1.

Referring to the drawings, F in each figure represents the frame.

Referring more particularly to Figs. 2, 3 and 4, 1 is the inside handle, 2 the catch proper which engages a plate in the door casing and holds the door shut. 3 is the flush plate which is pushed on from the outside to draw the catch back and 4 is the pivot about which this plate swings. At 5 is designated a hand hold which is taken hold of to pull the door open after pushing the plate in to draw the catch back.

The handle 1 slides beneath the plate 6. The spring 7 keeps the catch pushed out and the spring itself is held by the stationary pin 8. The handle has the slot 9 cut in the bottom where the pin projects through.

Figure 2:
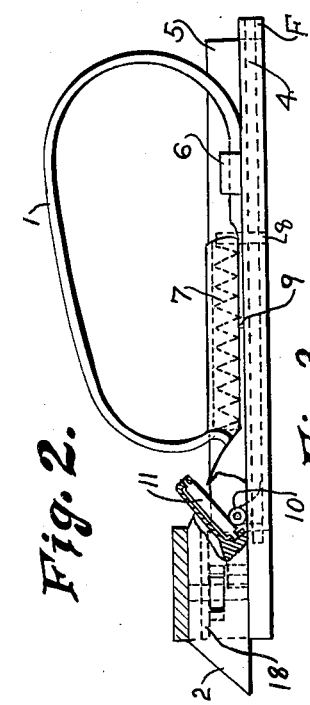
Fig. 2 is a side view of one type of latch with a part of the catch broken away to better show the operating mechanism.
Figure 3:
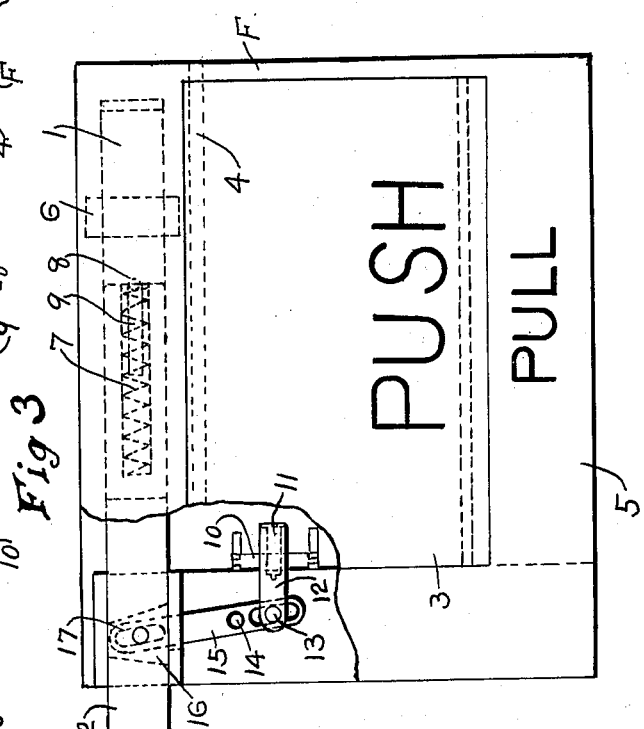
Fig. 3 is a front elevation of the same latch with part of the front surface removed to show the operating mechanism.

The operating mechanism is best shown in te cut out parts of Figs. 2 and 3. The hinged plate 3 has the roller 10 fastened to one side of it to engage the roller 11 which acts as a cam. The roller 11 is part of the slide 12 which is moved to the left when the hinged plate is pushed in. The slide 12 is fastened at 13 to the lever 15 which is pivoted on the stationary pin 14. The lever 15 fits into the slot 16 of the catch and is connected to it by the pin 17. The plate 18 forms a casing for the lever and a means to fasten the stationary pin.

Figure 4:
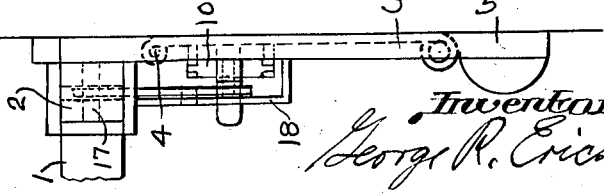
Fig. 4 is an end view of the same latch.

The operation of the latch shown in Figs. 2 to 4 is as follows: The hinged plate 3 is pushed in with the hand. As the plate swings in the roller 10 engages the roller 11 and moves the slide 12 to the left, thereby swinging the lever 15 about the stationary pin 14 and moving the catch to the right. The door is now ready to be opened and the fingers are put over the hand hold 5, by which the door may be pulled open. From the inside, the handle 1 may be used to pull the door shut and also to pull back the catch to open the door.

Referring to Figs. 5 and 6, 19 is a handle on the inside and is fastened to the catch 27. The push plate 20 is pivoted at 21. The roller 22 is fastened to the lever arm 23 and engages the inside of the push plate. The lever arm has a stationary pivot at 24 and a roller 25 at the other end. The roller engages the lug 26 to draw the catch back when the push plate is pushed in. The spring 29 keeps the catch pushed out. The catch is shown at 27 and the hand hold at 28.

The operation is as follows: The push plate 20 is pushed in by the fingers, moving the lever 23 about the pivot 24. This moves the roller 25 against the lug 26 and draws the catch back. The fingers are placed on the hand hold and the door may be pulled open. When the hand is removed, the plate swings back and leaves the outside surface smooth again.

Referring to Figs. 7 and 8, the push plate 30 is pivoted at 31 and held in place by the spring 32. The catch 33 has the handle 34 and the spring 35 within it to hold the catch out. The stationary pin 36 holds the spring in place and projects through the slot 37 in the bottom of the catch.

In both this modification and in the one shown in Figs. 5 and 6, a rope or cord handle may be provided on the inside of the door to pull the door shut from the inside. The cord handle is light in weight and durable and may be fastened at a convenient place on the inside of the door. Though not shown in the drawings, lugs or holders might be made on one side of the latches shown in Figs. 5 to 8, to secure the ends of a cord handle. Or if desired a handle for the inside might be provided as in the first modification shown.

In operation, the plate 30 is pushed in as shown by the broken lines in Fig. 8 and the fingers are placed over the handle 34, drawing back the catch and pulling open the door.

Referring to Figures 9 and 10, the handle 38 is pivoted at 39 and has the cam 40 so arranged as to swing around the pivot to the right and engage the lug 42 of the catch. The spring 41 is fastened so that its end bears against the neck of the handle and tends to rotate the handle about the pivot. The curved handle 43 is used for pulling the catch 44 back when the operator is on the inside of the door. The lug 45 projects from the bottom of the catch and is engaged by the spring 46. The spring is held in place by the pin 47.

The inside casing for the mechanism is cut out as shown at 48 to allow the handle 43 to extend through.

At 49 is shown a release button, which when pushed from the outside releases the handle and allows the spring 41 to push it outward until the cam 40 engages the lug 42. The button itself is designated at 49 and has the pin 50 which extends through the circular casing 54. The pin 50 is surrounded by a spring to keep the button pushed out flush with the surface and the pin also has the key in the end as shown. At 51 is shown a pivoted cam or pawl which has a cam surface contacting the inside of the button. As the button is pushed in the catch 51 is moved about its pivot, so that its end is drawn out of the notch 53 cut in the handle 38 and the handle is released.

The operation is as follows: One on the outside who wishes to open the door puts a finger on the button and presses it. This draws the catch 51 out of the notch 53 of the handle and the spring 41 then rotates the handle about the pivot 39. The space between the cam lug 40 and the lug 42 allows the handle 38 to be thrown out where it can be taken hold of with the fingers. The handle is then pulled out, swinging the cam 40 about the pivot 39 and pushing the catch 44 to the right by means of the lug 42.

The spring 46 returns the catch 44 and the handle 38 so that the handle projects through to the inside of the door enough to be taken hold of. From the inside the handle 38 is taken hold of and the door pulled shut. This brings the catch 51 back into the notch 53 and holds the handle in place, leaving a smooth and unbroken surface on the outside of the door. From the inside the handle 43 is used to bring the catch 44 back to open the door.

Referring to Figs. 11 and 12, 56 is a push plate and 57 the pivot about which it swings. The hand hold is shown at 58 and the catch at 59. A roller 60 is placed on the back of the catch to make the operation easier and a handle for opening from the inside is shown at 61. This handle 61 may be made in the form shown in Fig. 2 if desired, or a rope handle may be provided. The spring 62 presses the catch outward and the pin 63 holds the spring in place.

The operating mechanism consists of a cam 64 which is secured to the push plate as at 65. The cam contacts with one end of a lever 66 which is pivoted at 67. The link 68 connects lever 66 to lever 69 which is pivoted at 70. The end of the lever 69 is connected at 71 to an extension of the catch 59.

The operation is as follows: The push plate 56 is pushed in with the hand moving the cam 64 about the pivot 57. This swings the two levers 66 and 69 about their pivots 67 and 70 and draws the catch 59 back. The fingers are placed over the hand hold and the door is pulled open. When the hand is removed the push plate returns, leaving a smooth surface on the outside.

The construction of the cam surfaces 64 and 66 should preferably be such that the catch will be pulled all the way back in the first part of the movement of the push plate. It is preferable that the catch should be all the way back when the part of the push plate next to the hand hold has been moved in from one half to three quarters of an inch. The cam surfaces should then be neutral, that is, should slide over each other without giving further motion to the catch. This is so that persons with different size hands will not have difficulty in holding the catch back while pulling the door open.

Referring now to Figs. 13 to 16, two handles are shown at 72 and 73, the one at 73 being used to open the door from the inside. A push plate is shown at 74 and a pivot for the handles at 75. The two handles and push plate form a single element, the whole of which swings about the pivot at 75. The push plate is made thin on the sides to reduce weight and is strengthened by the rib 77 extending from the pivot to the hande 73.

The pivot has an enlarged portion at the center of which the handle is fastened and the bearings 76. The handle at the center has the screw cam attached to it. This cam fits into a slot in the catch 81 and operates against the roller 80. The cam revolves about the pivot when the handle is turned and operates to move the catch back against the force of the spring 82. The roller 83 is provided to make the catch operate easier. The spring catch at 84 serves to hold the handle in a closed position.

The operation is as follows: When on the outside and wishing to open the door, the push plate 74 is pushed in with the fingers. This swings the handle 72 out from the spring catch 84 so that the handle may be taken hold of. The handle is then pulled out, rotating it around the pivot 75 until the catch 81 has been pulled back, whereupon the door will open. The cam is preferably constructed as shown at 79a so that there will be no force tending to draw back the catch until the handle can be taken hold of with the fingers.

When released, the spring causes the handle to return so that 72 may be taken hold of from the inside to pull the door closed. When wishing to open the door from the inside, the handle 73 is pulled down about the pivot, thereby operating the cam and drawing the catch back. When the door is pulled closed from the inside, the spring 84 holds the handle in place so that it presents a smooth surface to the outside.

I claim:

1. In an aircraft or other rapidly moving vehicle, the body of the vehicle, having a substantially stream lined fuselage, a swinging door in the wall of said fuselage, a latch for holding said door in closed position, and means for manually operating the latch from both the inside and the outside, said means being entirely within the stream line of the fuselage.

2. In a door for aircraft, a handle having an outer surface substantially flush with the surface of the door, a hand-hold adjacent said handle, a cover for said hand-hold, a yieldable means for normally holding said cover in such position that its outer surface is flush with the outer surface of the door.

3. In a door for aircraft, a handle having its outer surface substantially flush with the surface of the door, a hand-hold adjacent said handle, a cover for said hand-hold having its surface normally flush with the surface of the door, yieldable means for holding the cover in said position, a latch for said door, and a connection between said cover and said latch for releasing the latch upon displacement of the cover.

4. In a door for aircraft, a handle having a surface substantially flush with the surface of the door, a hand-hold adjacent such handle, a pivoted cover for said hand-hold, a latch for said door comprising a slidable bolt and spring for releasing said bolt in one direction, and connections between the bolt and the cover whereby inward displacement of the cover will withdraw said bolt and compress said spring, and said spring will normally maintain the cover in position with its outer surface substantially flush with the surface of the door.

5. In an aircraft, a fuselage, a door for the fuselage, a latch for the door, handle for operating the latch from within the fuselage, and means accessible from the outside of the fuselage, and within the stream line of said fuselage for operating the latch.

6. In an aircraft, a fuselage, a door, a handle for said door, a latch operated by said handle, said handle forming a part of the stream line of the fuselage, said latch being operable from either side of the door.

7. In a latch for doors, a bolt, a hinged operating handle therefor, said hinge being arranged to permit the handle to be folded back substantially flush with the surface of the latch, a hinged member normally flush with the surface of the latch, and connections between said member and said handle whereby an inward movement of the member will swing the handle out so that it may be easily grasped.

8. In a swinging door, a handle flush with the surface of the door, an opening in the surface of the door through which the handle may be grasped, a cover for said opening, a slidable bolt, and connections whereby the displacement of the cover will operate the slidable bolt.

9. In a door latch, a frame, said frame being adapted to fit substantially flush with the outer surface of a door, said frame having a hand opening therein, a manually displaceable closure for said opening, said closure normally presenting an outer surface flush with said frame, means for operating the said latch from the inside of said door, and means available through the said hand opening for operating the said latch from the outer side of said door.

10. In a door latch, a frame, said frame being adapted to fit substantially flush with the outer surface of a door, said frame having a hand opening therein, a manually displaceable closure for said opening, said closure normally presenting an outer surface flush with said frame, and means available through the said hand opening for operating the said latch from the outer side of said door.

In testimony whereof, I affix my signature.

GEORGE R. ERICSON.